(12) United States Patent
Asano

(10) Patent No.: US 9,116,299 B2
(45) Date of Patent: Aug. 25, 2015

(54) LENS APPARATUS

(71) Applicant: CANON KABUSHIKI KAISHA, Tokyo (JP)

(72) Inventor: Takurou Asano, Kawachi-gun (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/148,827

(22) Filed: Jan. 7, 2014

(65) Prior Publication Data

US 2014/0198247 A1   Jul. 17, 2014

(30) Foreign Application Priority Data

Jan. 11, 2013   (JP) .................................. 2013-003180

(51) Int. Cl.
| | | |
|---|---|---|
| *G03B 13/00* | (2006.01) | |
| *G02B 7/28* | (2006.01) | |
| *G03B 17/00* | (2006.01) | |
| *H04N 5/232* | (2006.01) | |
| *G03B 13/36* | (2006.01) | |

(52) U.S. Cl.
CPC ................ *G02B 7/282* (2013.01); *G03B 17/00* (2013.01); *H04N 5/232* (2013.01); *H04N 5/23212* (2013.01); *H04N 5/23296* (2013.01); *G03B 13/36* (2013.01)

(58) Field of Classification Search
CPC .... G02B 7/282; G02B 7/365; H04N 5/23212; G03B 13/36
USPC ....................... 348/345–356; 359/568; 396/72
See application file for complete search history.

(56) References Cited

U.S. PATENT DOCUMENTS

| | | | | |
|---|---|---|---|---|
| 2007/0172221 A1* | 7/2007 | Moriya | ............................ | 396/78 |
| 2009/0141141 A1* | 6/2009 | Onozawa | ................... | 348/222.1 |
| 2011/0293256 A1* | 12/2011 | Ishiwata et al. | ............... | 396/104 |
| 2013/0113985 A1* | 5/2013 | Ikeda et al. | ................... | 348/347 |
| 2013/0128098 A1* | 5/2013 | Hamamura | ................... | 348/346 |
| 2014/0341553 A1* | 11/2014 | Kikuchi | .......................... | 396/81 |

FOREIGN PATENT DOCUMENTS

JP     06-062302 A     3/1994

* cited by examiner

*Primary Examiner* — Mekonnen Dagnew
(74) *Attorney, Agent, or Firm* — Rossi, Kimms & McDowell LLP

(57) ABSTRACT

A lens apparatus includes zoom and focus units, zoom, and focus position detectors, a focus driver, an in-focus distance unit, used to input a command, a memory storing a table representing a focus position associated with the zoom position and the in-focus distance, and a controller controlling the focus driver based on the command and performing periodically first operation of determining a zoom number based on the zoom position, second operation of determining an in-focus-distance number based on the command, third operation of calculating a provisional target for the command based on data extracted from the table with reference to the zoom and in-focus-distance numbers, fourth operation of calculating a target associated with the zoom position from the provisional target, fifth operation of driving the focus unit to the target. Between the first and fifth operations, the fourth operation is performed but the second and third operations are not.

10 Claims, 12 Drawing Sheets

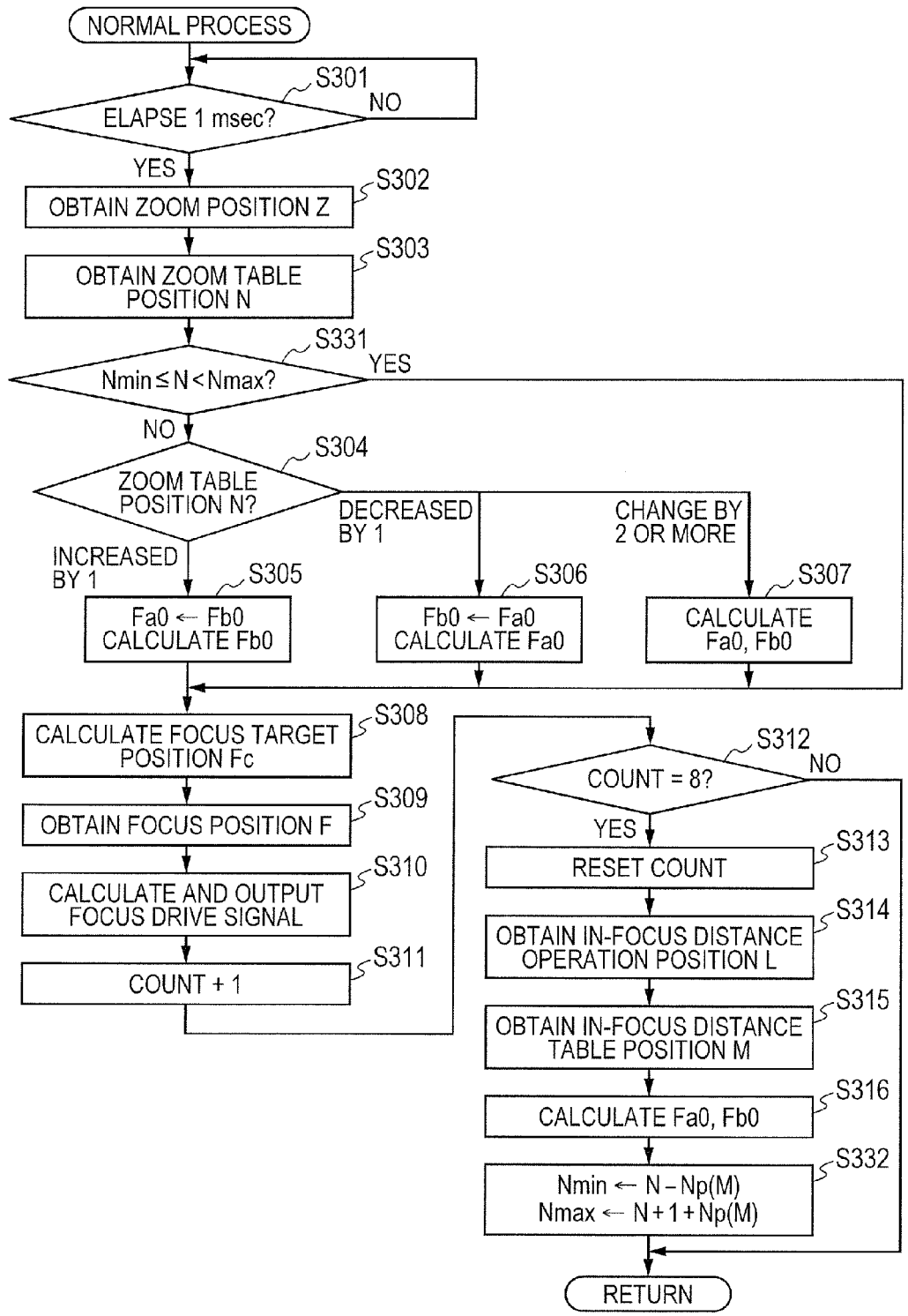

LENS APPARATUS

BACKGROUND OF THE INVENTION

1. Field of the Invention

The present invention relates to a lens apparatus and more particularly to a lens apparatus having a zoom, lens.

2. Description of the Related Art

In recent times, zoom lens apparatuses for still image shooting or video shooting that are small in size and light in weight in favor of portability are demanded. For this reason, many rear focus type zoom lens apparatuses in which a focus lens for focus adjustment is located closer to the image pickup element than a zoom lens for varying the magnification have been developed.

In the rear focus type zoom lens apparatus, in order to perform zooming while maintaining the imaging position, it is necessary to control the position of the focus lens appropriately with changes of the position of the zoom lens. The controlled position of the focus lens with a change in the position of the zoom lens cannot be computed by simple calculation. For this reason, control positions of the focus lens with variations in the position of the zoom lens at every in-focus distance are typically stored in advance as table data in a ROM, and the controlled position of the focus lens is determined using the table data.

With increases in the image quality of image pickup apparatuses, rear focus type zoom, lens apparatuses tend to have small depths of field. In consequence, high accuracy in the aforementioned controlled position of the focus lens is required. To meet this requirement, finer (or more detailed) table data is needed, necessitating a ROM having a large capacity.

As a solution to the above-described problem, Japanese Patent Application Laid-Open No. H06-62302 teaches to employ table data and interpolation calculation in combination to thereby determine a controlled position of the focus lens at high accuracy while preventing an increase in the ROM capacity.

However, the prior art technique disclosed in Japanese Patent Application Laid-Open No. H06-62302 employs three steps of interpolation processing that take processing time, leading to long time taken from the detection of the zoom position to the start of driving of the focus lens. Consequently, quick zooming operation will lead to a large difference between the focus lens position that, brings an object in focus at the time of detection of the zoom position and the focus lens position that brings the object in focus at the time of driving of the focus lens, likely leading to a focus error.

SUMMARY OF THE INVENTION

An object of the present invention is to reduce the time taken from detection of the zoom position to driving of the focus lens and to provide a lens apparatus in which a focus error with zooming operation is not likely to occur.

A lens apparatus according to the present invention comprises a zoom, unit that changes a focal length; a zoom position detector that detects a zoom position, the zoom position being the position of the zoom, unit; a focus unit that changes an in-focus distance and corrects a displacement of an imaging position caused by driving of the zoom unit; a focus position detector that detects a focus position, the focus position being the position of the focus unit; a focus driver that, drives the focus unit; an in-focus distance input unit used to input an in-focus distance command value; a table memory unit in which table data representing a position of the focus unit associated with the zoom position and the in-focus distance is stored; a focus controller that, outputs, based on the in-focus distance command value input through the in-focus distance input, unit, a drive signal to the focus driver so as to drive the focus unit, wherein the focus controller performs the following operations respectively periodically: a first operation of deriving a plurality of provisional focus target positions based on a zoom position detected by the zoom position detector, and in-focus distance directed by the focus operation unit and the relationship stored in the memory unit; and a second operation of deriving a focus target position by interpolation calculation based on the plurality of provisional focus target positions that are derived a frequency of the first operation is less than a frequency of the second operation.

The present invention can reduce the time taken from detection of the zoom position to driving of the focus lens and provide a lens apparatus in which a focus error with zooming operation is not likely to occur.

Further features of the present invention will become apparent from the following description of exemplary embodiments with reference to the attached drawings.

BRIEF DESCRIPTION OF THE DRAWINGS

FIG. 14 is a flow chart of a normal process in the third embodiment.

DESCRIPTION OF THE EMBODIMENTS

Preferred embodiments of the present invention will now be described in detail in accordance with the accompanying drawings.

First Embodiment

Figure 1:
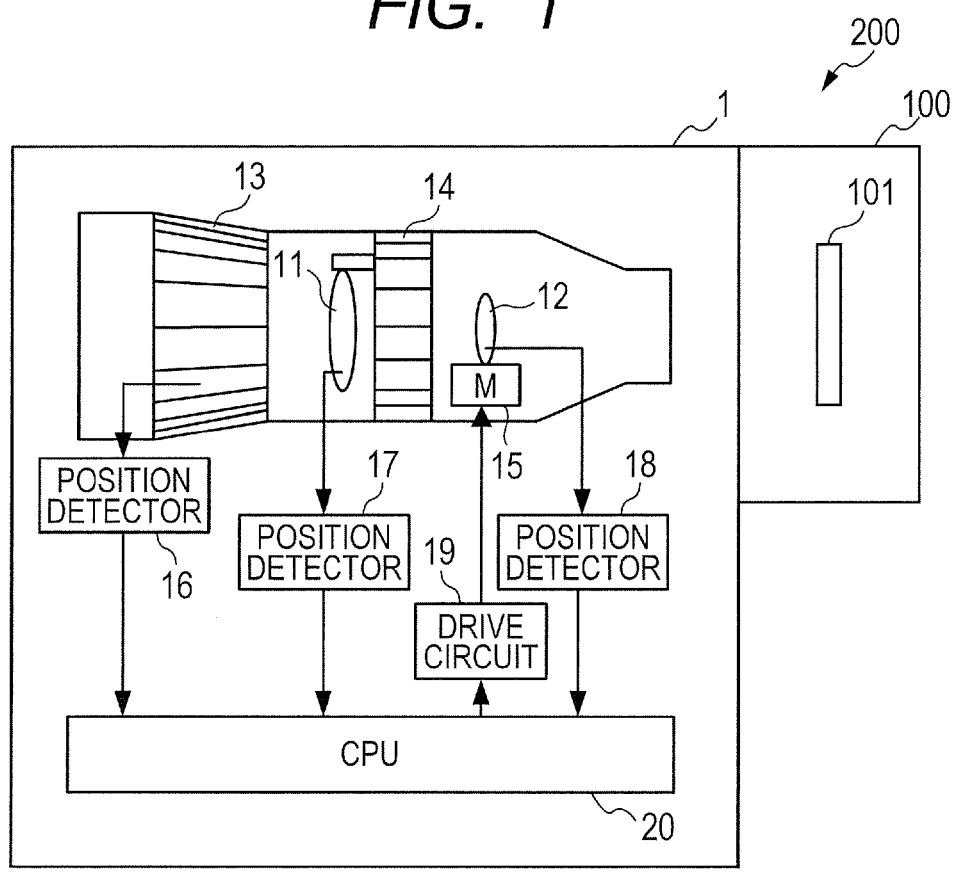
FIG. 1 is a block diagram shoving the construction of a zoom lens apparatus 1 according to the present invention.

FIG. 1 is a diagram showing the construction of a lens apparatus 1 according to a first, embodiment, to which the present invention can be applied.

The lens apparatus 1 includes a zoom lens unit 11, a focus lens unit 12, a focus operation ring 13, a zoom operation ring 14, a focus motor 15, a focus operation ring position detector 16, a zoom position detector 17, a focus position detector 18, a focus drive circuit 19, and a CPU 20. The zoom lens unit 11 is an optical element that, shifts along the optical axis direction to vary the focal length of the lens apparatus 1. The zoom operation ring 14 is an operation ring used to mechanically operate the zoom lens unit 11. Rotating the zoom operation ring 14 causes the zoom lens unit 11 to shift straightly along the optical axis direction. The optical axis direction refers to the horizontal direction in FIG. 1. The zoom position detector 17 is a position detector used to detect the position of the zoom lens unit 11. A position signal obtained by the zoom position detector 17 is converted into a digital signal as zoom position data and input to the CPU 20.

The lens apparatus 1 is detachably connected to a camera apparatus 100 provided with an image pickup element. 101 therein, to thereby constitute an image pickup apparatus 200. The image pickup element 101 receives light, from the lens apparatus 1.

The focus lens unit 12 is an optical element that shifts along the optical axis direction to change the imaging position of the lens apparatus 1. In other words, the in-focus distance (object distance) can be changed by the shift of the focus lens unit 12, where the in-focus distance is defined as a distance between an image point to an in-focus point. The focus lens unit 12 can also serve as a unit that corrects a displacement of the imaging position with a shift, of the zoom lens unit 11 along the optical axis direction. The focus lens unit 12 is arranged closer to the image than the zoom lens unit 11. The CPU 20 drives the focus motor 15 through the focus drive circuit 19, thereby driving the focus lens unit 12 along the optical axis direction. The focus position detector 18 is a position detector used to detect the position of the focus lens unit 12. A position signal obtained by the focus position detector 18 is converted into a digital signal as focus position data and input to the CPU 20.

The focus operation ring 13 (in-focus distance input unit) is an operation ring used to set the in-focus distance of the lens apparatus 1. The focus operation ring position detector 16 is a position detector used to detect the rotational position of the focus operation ring 13. A rotational position, signal obtained by the focus operation ring position detector 16 is converted into a digital signal as in-focus distance operation position data and input to the CPU 20.

The CPU 20 is a control device (focus control unit) that electrically controls the focus lens unit 12. The CPU 20 receives the zoom position data, the focus position data, and the in-focus distance operation position data input thereto and generates a control signal through software processing that will be described later.

The lens apparatus 1 according to this embodiment is a rear focus type lens apparatus in which a shift of the zoom lens unit 11 along the optical axis direction causes a change in the focal length and a change in the in-focus distance as well. Therefore, to change the focal length without changing the in-focus distance, it is necessary to control the position of the focus lens unit 12 appropriately in accordance with the position of the zoom lens unit 11.

Now, table data used in the later-described software processing and terms used in the description of the table data will be described.

There are three types of tables used in this embodiment, which include a zoom table, an in-focus distance table, and a focus table. These tables are stored in the CPU 20 serving as a table storage unit.

The zoom table is a table in which fifty zoom positions including the wide angle end position and the telephoto end position in order from the wide angle end position. Numbers allocated to the fifty zoom positions in order from the wide angle end will be referred to as zoom table numbers N (or zoom reference numbers), and a zoom position corresponding to a zoom table number N is represented by Z(N).

The in-focus distance table is a table in which twenty in-focus distance operation positions including the closest distance and infinity are stored in order from the closest distance. Numbers allocated to the twenty in-focus distance operation positions in order from the closest distance will be referred to as in-focus distance table numbers K (or in-focus distance reference numbers), and an in-focus distance operation position corresponding to an in-focus distance table number M will be represented by L(M).

The focus table is a two-dimensional table in which target positions for the focus lens unit 12 (which will be hereinafter referred to as focus target positions) associated with the aforementioned fifty zoom positions and twenty in-focus distance operation positions are stored. The focus target, positions stored in the focus table are represented by f(N, M) using the zoom table number N and the in-focus distance table number M.

Now, software processing executed by the CPU 20 in the first, embodiment will be described.

Figure 2:
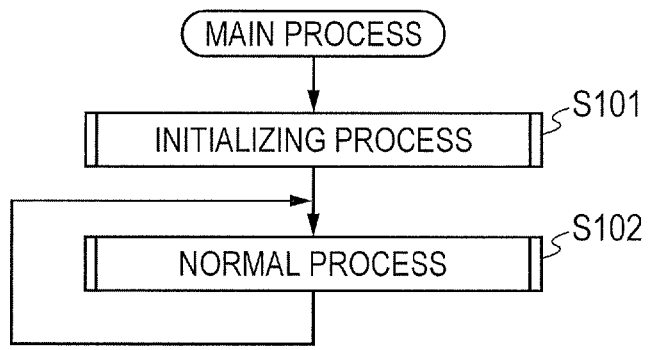
FIG. 2 is a flow chart of a main process executed by a CPU 20 in the present invention.

FIG. 2 is a flow chart of the main process of the software processing executed by the CPU 20 in this embodiment. The main process includes an initializing process (S101) and a normal process (S102). While the initialing process is executed only once after power on, the normal process is executed repeatedly and periodically.

Figure 3:
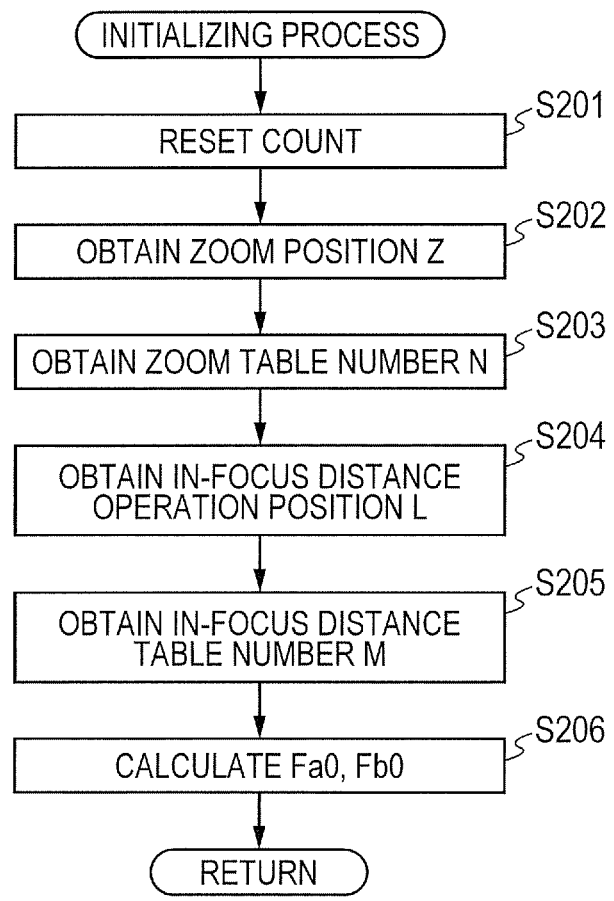
FIG. 3 is a flow chart of an initializing process in a first embodiment of the present invention.

FIG. 3 is a flow chart of the initializing process (S101 in FIG. 2) in the first embodiment. In step S201, a counter used in the normal process (described later) is reset to zero. In step S202, a zoom position E is obtained from the zoom position detector 17. In step S203 (first operation), a zoom table number N whose corresponding zoom position is largest within the range not exceeding the zoom position Z obtained in step S202. This number N is obtained by comparing the zoom position Z obtained in step S202 with zoom positions Z (X) stored in the above-described zoom table.

In step S204, an in-focus distance operation position L is obtained from the focus operation ring position detector 16. In step S205 (second operation), an in-focus distance table number M whose corresponding in-focus distance operation position is largest within the range not exceeding the in-focus distance operation position L obtained in step S204. This number K is obtained by comparing the in-focus distance operation position L obtained in step S204 with in-focus distance operation positions L(X) stored in the above-described in-focus distance table.

In step S206, provisional focus target positions Fa0 and Fb0 are calculated. The provisional focus target, positions are intermediate data used to calculate a final focus target, position Fc. The provisional focus target positions Fa0 and Fb0 are calculated from the zoom table number N, the in-focus distance table number M, and the in-focus distance operation position L obtained in steps S203, S204, and S205 according to the following equations (third operation):

$$Fa0 = \frac{L - L(M)}{L(M+1) - L(M)}(f(N, M+1) - f(N, M)) + f(N, M) \quad \text{(Equation 1)}$$

$$Fb0 = \frac{L - L(M)}{L(M+1) - L(M)}(f(N+1, M+1) - f(N+1, M)) + f(N+1, M) \quad \text{(Equation 2)}$$

Figure 4:
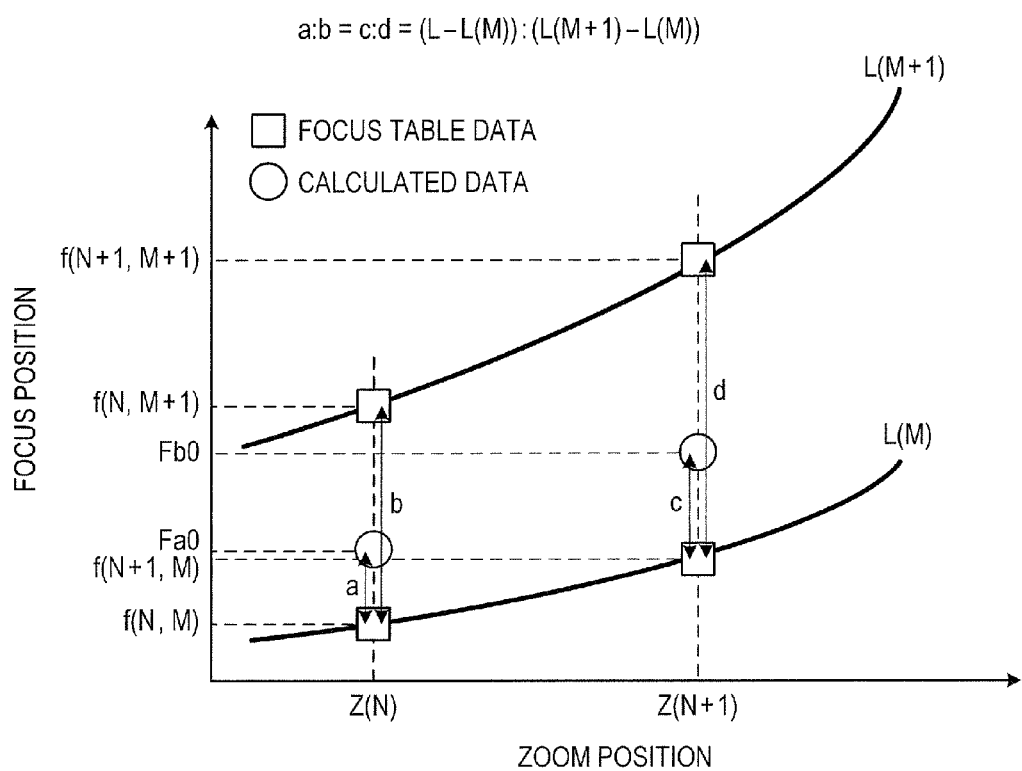
FIG. 4 is a graph illustrating provisional focus target positions Fa0, Fb0.

As shown in FIG. 4, Fa0 represents the focus target position associated with zoom position Z (N). The value of Fa0 is obtained by extracting f(N,M) and f(N,M+1) from the focus table and linearly interpolate them (interpolation calculation) using the in-focus distance command value L. On the other hand, Fb0 represents the focus target position associated with zoom position Z(N+1). The value of Fb0 is obtained by extracting f(N+1,M) and f(N+1,M+1) and interpolating them using the in-focus distance L.

The initializing process is done by the above-described processing in steps S201 to S206.

Figure 5:
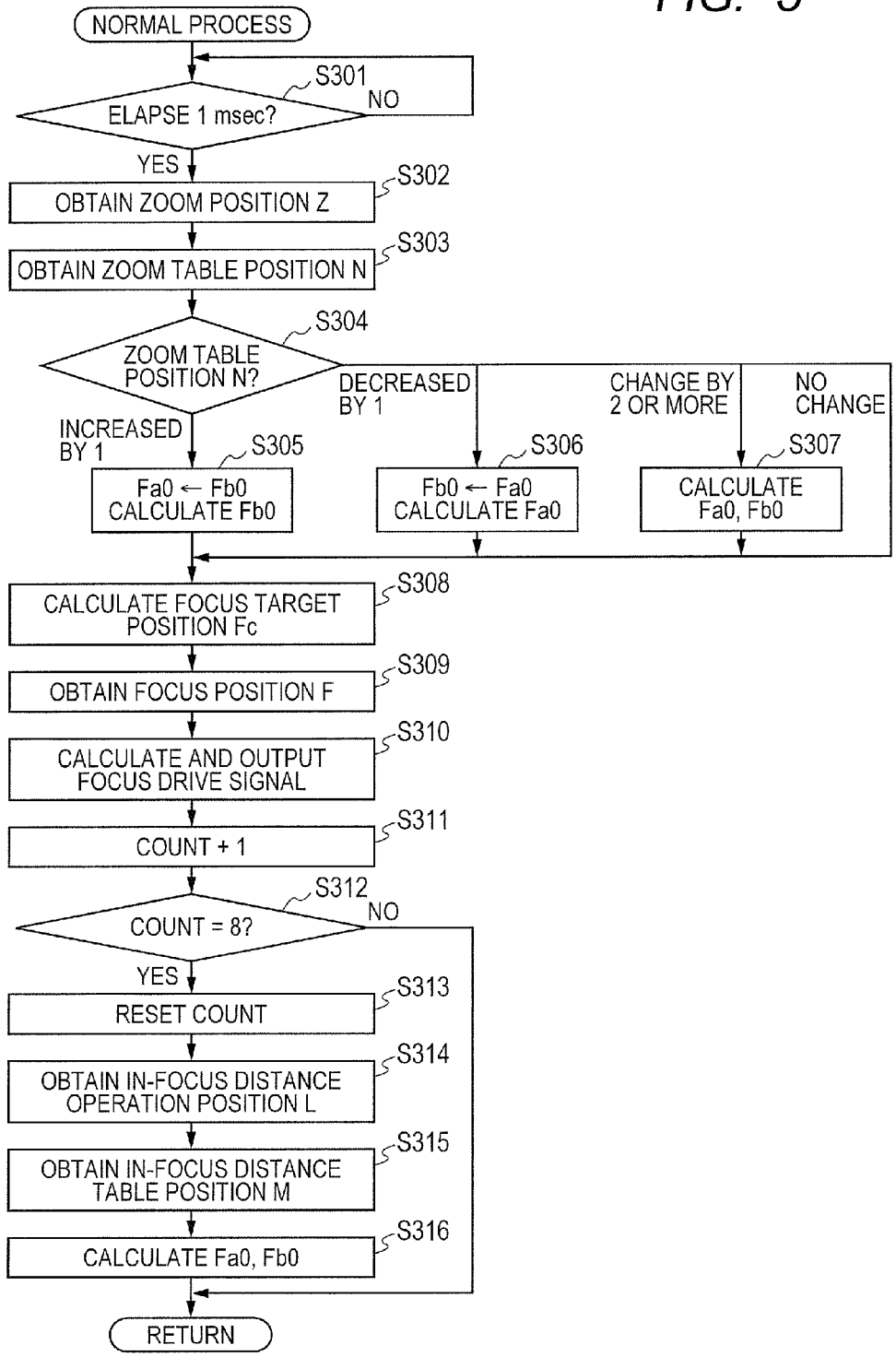
FIG. 5 is a flow chart of a normal process in the first embodiment.

FIG. 5 is a flow chart of the normal process (step S102 in FIG. 2) in the first embodiment. In step S301, it is determined whether a predetermined time (i.e. one millisecond) has elapsed since the last time this step S301 was executed. When one millisecond has elapsed, the process proceeds to step S302. In the case where step S301 is executed for the first time after the completion of the initializing process, it is considered that, one millisecond has already elapsed, and the process proceeds to step S302.

The processing in steps S302 and S303 is the same as that in steps S202 and S203, where the zoom position Z and the zoom table number N are obtained (first operation).

In step S304, it is determined whether or not the zoom table number N obtained in step S303 has changed (or is different) from the zoom table number previously obtained (namely whether or not the zoom reference number difference or the difference between the previous zoom reference number and the zoom reference number obtained this time is zero). If the zoom table number N has not changed (namely, if the zoom reference number difference is zero), the process proceeds to step S308 with no processing. If the zoom table number N has increased from the previous zoom table number by one, the process proceeds to step S305, where Fb0 is substituted for Fa0, and Fb0 is calculated again using equation 2 (sixth operation). This process is equivalent to calculating Fa0 and Fb0 again with zoom table number N, and calculation of Fa0 can foe obviated. If the zoom table number N has decreased from the previous zoom table number by one, the process proceeds to step S306, where Fa0 is substituted for Fb0, and Fa0 is calculated again using equation 1 (sixth operation). In this case, calculation of Fb0 can be obviated. If the zoom table number N has changed from the previous zoom table number by two or more (namely, if the zoom reference number difference is equal to or larger than 2), the process proceeds to step S307, where Fa0 and Fb0 are calculated again using equations 1 and 2 (sixth operation).

In step S308, the final focus target position Fc is calculated from the provisional focus target positions Fa0 and Fb0, the zoom position Z obtained in step S302, and the zoom table number N obtained in step S303 according to the following equation (fourth operation):

$$Fc = \frac{Z - Z(N)}{Z(N+1) - Z(N)}(Fb0 - Fa0) + Fa0 \quad \text{(Equation 3)}$$

Figure 6:
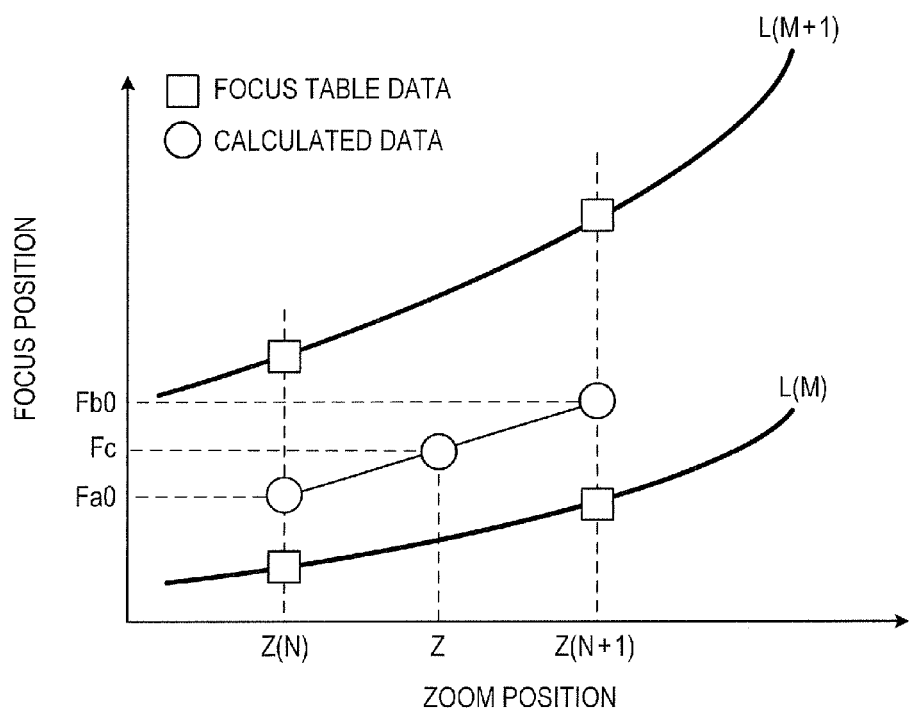
FIG. 6 is a graph illustrating a final focus target position Fc.

As shown in FIG. 6, the value of the final focus target position Fc is obtained by linearly interpolating the focus target position Fa0 associated with zoom position Z(N) and the focus target position Fb0 associated with zoom position Z(N+1) using the zoom position Z.

In step S309, the focus position F is obtained from the focus position detector 18. In step S310, a signal supplied to the focus drive circuit 19 is calculated from the focus position F and the final focus target position Fc and output (fifth operation). The calculation performed in this process is common servo processing in Which a signal supplied to the motor Is calculated based on the difference between the focus position F and the final focus target, position Fc, and the calculation method will, not be described specifically.

In step S311, the count is incremented by 1. In step S312, it is determined whether or not the count is 8. If the count is 8, the process proceeds to step S313. If the count is equal to or less than 7, the normal process is terminated. In step S313, the count is reset, to 0. The processing in steps S314 to S316 is the same as that in steps S204 to S206 and will not be described further. After completion of step S316, the normal process is terminated. By using the counter as described above, the processing in steps S302 to S310 is executed every one millisecond, and processing in steps S314 to S316 is executed every eight milliseconds. Thus, they are executed at different, processing cycle times.

Advantageous effects of this embodiment are as follows.

A problem encountered with a rear focus type lens apparatus is a focus error occurring with zooming operation. A cause of focus error occurring with zooming operation is a difference between the focus position that brings an object, in focus at the time of obtaining the zoom position and the focus position that brings the object in focus at the time of outputting the focus drive signal. This difference is due to time taken until the focus drive signal is affected by the obtained zoom position is reflected in. This difference depends on the delay time from the obtainment of the zoom position to the output of the focus drive signal. Specifically, the longer the time from the obtainment of the zoom position to the output of the focus drive signal is, the larger the difference is.

Figure 7:
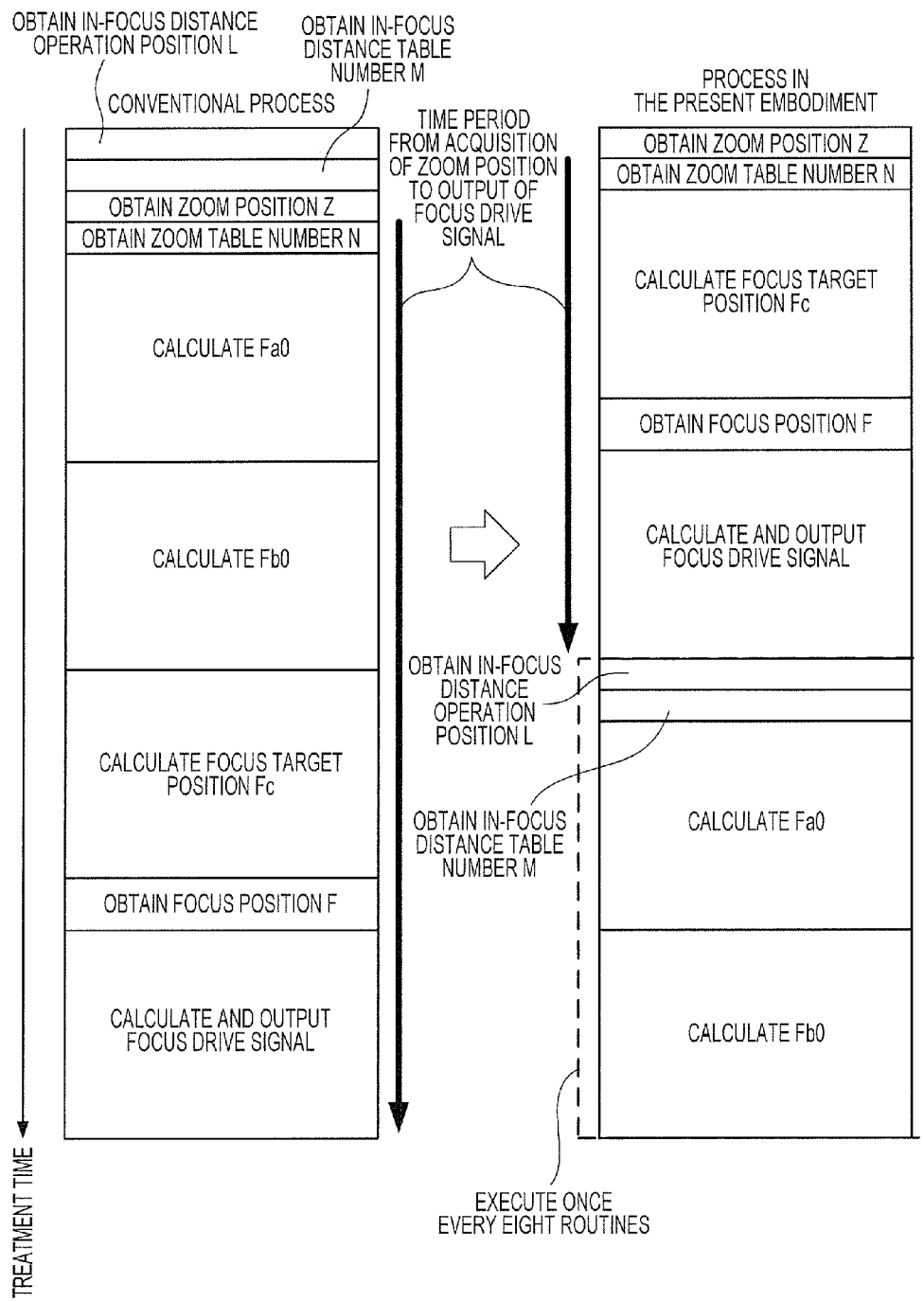
FIG. 7 is a chart illustrating differences between a prior art and the present invention.

FIG. 7 is a chart showing the order of and times taken by processing steps in a conventional process and the process in this embodiment. The calculations of Fa0, Fb0, and Fc include multiplication and division as specifically formulated in equations 1, 2, and 3 and take long processing times.

In conventional processing method, the time from the obtainment of the zoom position and the output of the focus drive signal is long, because calculations of all of Fa0, Fb0, and Fc are performed during the time from the obtainment of the zoom position, and the output of the focus drive signal. On the other hand, in the process in this embodiment, the order of processing steps is changed so that calculations of Fa0 and Fb0 are not performed during the time from the obtainment of the zoom position to the output, of the focus drive signal. Therefore, the time from the obtainment of the zoom position and the output of the focus drive signal can be made very short. In the process in this embodiment also, if the processing in step S307 is executed, calculations of Fa0 and Fb0 are necessitated, leading to a long processing time as with in the conventional process. However, assuming that the time taken to drive the zoom lens at the highest speed all through the entire zoom range is 0.1 second, the frequency of changes of the zoom table number N (0 to 49) is approximately once per every 20 milliseconds on the average. Consequently, as long as the processing in steps S302 to S310 is executed in a cycle of 1 millisecond, the zoom table number N will not change by 2 or more, and the processing in step S307 will not be executed. Although there may be cases where the zoom table number N changes by 1 and the processing in step S305 or S306 is executed to necessitate calculation of Fa0 or Fb0, the frequency of the occurrence of such cases is low. Therefore, the processing time taken from the obtainment of the zoom position to the determination of the focus target position is much shorter than that in the conventional process as shown in FIG. 7 in most cases. In consequence, the delay time taken from the obtainment of the zoom position until the focus drive signal is affected by the zoom position is short, making a focus error smaller or unlikely to occur.

Furthermore, in this embodiment, the cycle of calculations of Fa0 and Fb0 and the cycle of calculation of Fc are different from each other. In consequence, while the cycle of determining the final focus target position Fc taking into account the in-focus distance operation position L is long, the processing load on the CPU 20 can be reduced without changing the cycle of determining the final focus target position Fc taking into account the zoom position Z.

Second Embodiment

The construction of a lens apparatus 1 according to the second embodiment to which the present invention can be applied is the same as that of the lens apparatus according to the first embodiment and will not be described further.

Software processing executed by the CPU 20 in the second embodiment will be described.

The flow chart of the main process of the software processing executed by the CPU 20 in this embodiment is the same as that in the first embodiment. The initializing process and the normal process, which are different from those in the first embodiment, will be described in the following.

Figure 8:
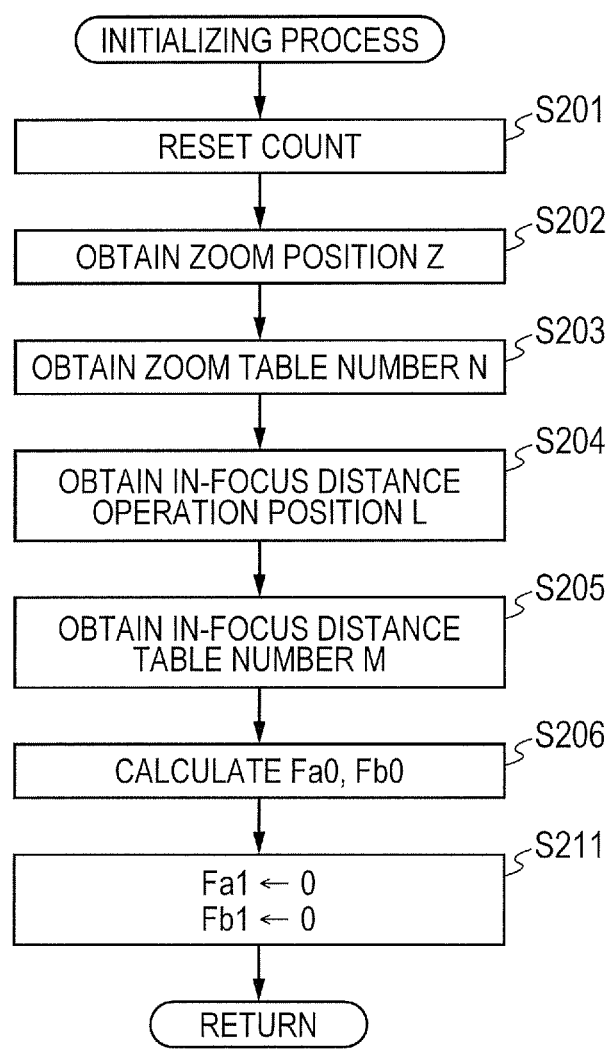
FIG. 8 is a flow chart of an initializing process in a second embodiment.
Figure 9:
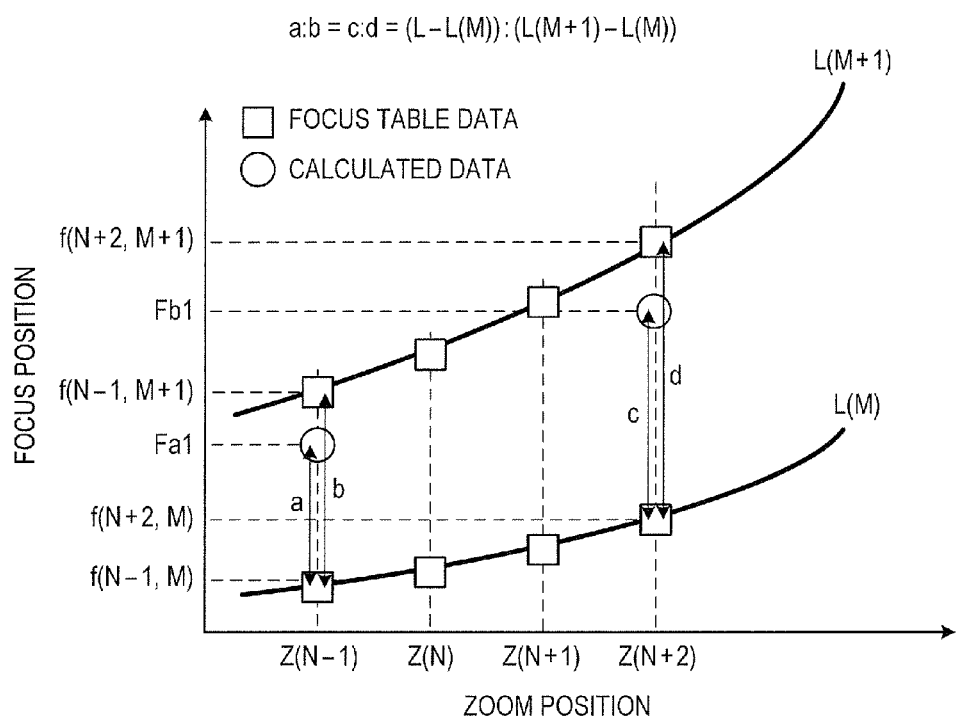
FIG. 9 is a graph illustrating preliminary provisional focus target positions Fa1, Fb1.

FIG. 8 is a flow chart of the initializing process (step S101 in FIG. 2) in the second embodiment. The processing in steps S201 to S206 is the same as that in the first embodiment. In step S211, the values of preliminary provisional focus target positions Fa1 and Fb1 are set to zero. As shown in FIG. 9, Fa1 and Fb1 are focus target positions associated with zoom positions Z(N−1) and Z(N+2) respectively. The value zero substituted in step S211 is a value that will never be obtained as a result in the later-described calculation, and the fact that the values of Fa1 and Fb1 are zero indicates that calculation has not been performed.

Figure 10:
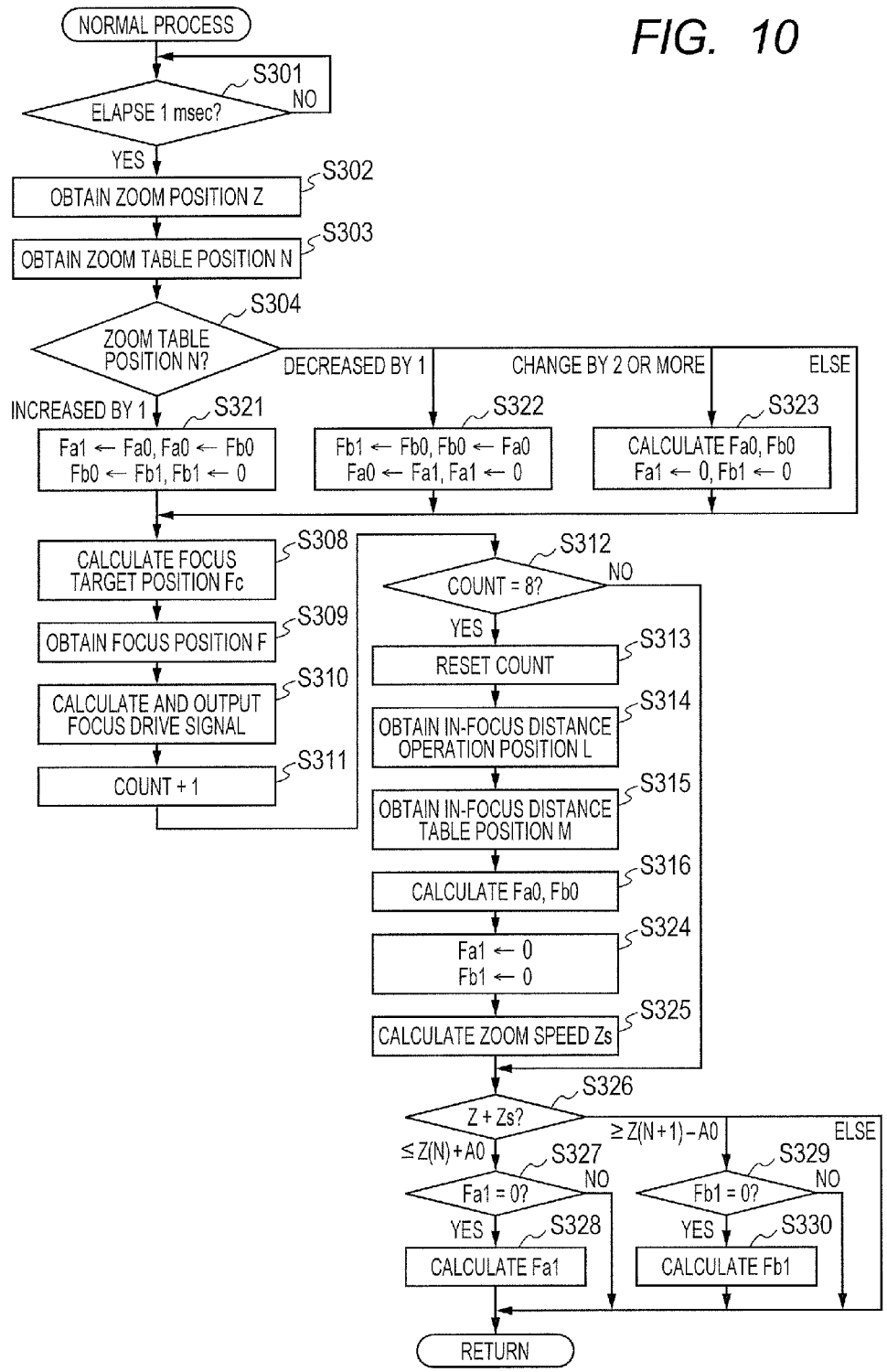
FIG. 10 is a flow chart of a normal process in the second embodiment.

FIG. 10 is a flow chart of the normal process (step S102 in FIG. 2) in the second embodiment. If the zoom table number N has increased from the previous zoom table number by one in step S304, the process proceeds to step S321, where Fa0 is substituted for Fa1, Fb0 is substituted for Fa0, Fb1 is substituted for Fb0, and the value of Fb1 is set to zero. If the zoom table number N has decreased from the previous zoom table number by one, the process proceeds to step S322, where Fb0 is substituted for Fb1, Fa0 is substituted for Fb0, Fa1 is substituted for Fa0, and the value of Fa1 is set to zero. If the zoom table number N has changed from the previous zoom table number by two or more, Fa0 and Fb0 are calculated in the same manner as the first embodiment, and zero is substituted for Fa1 and Fb1.

The processing in steps S308 to S316 are the same as the corresponding processing in the first embodiment. After the values of Fa0 and Fb0 are newly calculated in step S316, the process proceeds to step S324, where the values of Fa1 and Fb1 are set to zero.

After completion of the processing in step S324 or if the count is not 8 in step S312, the process proceeds to step S325, where a zoom speed Zs is calculated. The zoom speed Zs is calculated from the difference between the zoom position Z obtained in step S302 and the zoom position Za obtained in the previous execution of step S325.

Then in step S326, it is determined whether the sum of the present zoom position Z and the zoom speed Zs is equal to or smaller than Z(N)+A0, equal to or larger than Z(N−1)−A0, or other. The value A0 mentioned here represents an allowable value for the absolute value of the zoom acceleration. The value A0 is stored beforehand as a fixed value. In this step, it is determined whether there is a possibility that the zoom position Z detected in the next, detection will become equal to or smaller than Z (N) or equal to or larger than Z(N+1). If the sum is equal to or smaller than Z (N)+A0, namely if there is a possibility that the zoom position detected in the next, detection will become equal to or smaller than Z(N), the process proceeds to step S327, where it is determined whether or not the value of the preliminary provisional focus target position Fa1 is zero, namely it is determined whether or not the value of Fa1 has already been calculated. If the value of the preliminary provisional focus target value Fa1 has not been calculated, the process proceeds to step S328, where the value of Fa1 is calculated from the zoom table number N, the in-focus distance table number M, and the in-focus distance operation position L according to the following equation (seventh operation):

$$Fa1 = \frac{L - L(M)}{L(M+1) - L(M)}(f(N-1, M+1) - f(N-1, M)) + \\ f(N-1, M)$$ (Equation 4)

On the other hand, if the sum is equal to or larger than Z(N+1)−A0 in step S326, namely if there is a possibility that the zoom position Z detected in the next detection will become equal to or larger than Z(N−1), the process proceeds to step S329, where it is determined whether or not the value of the preliminary provisional focus target position Fb1 is zero, namely it is determined whether or not the value of Fb1 has already been calculated. If the value of the preliminary provisional focus target value Fb1 has not been calculated, the process proceeds to step S330, where the value of Fb1 is calculated from the zoom table number N, the in-focus distance table number M, and the in-focus distance operation position L according to the following equation (seventh operation):

$$Fb1 = \frac{L - L(M)}{L(M+1) - L(M)}(f(N+2, M+1) - f(N+2, M)) + \\ f(N+2, M)$$ (Equation 5)

Advantageous effects of this embodiment are as follows. In the first embodiment, calculation of Fa0 or Fb0 is performed by the processing in step S305 or S306 during the period from the detection of the zoom position in step S302 to the output of the focus drive signal in step S310. This possibly leads to a long processing time. On the other hand, in this embodiment, calculation of Fa1 or Fb1 associated with a zoom position for which the zoom table number is next to the zoom table number for the zoom position associated with Fa0 or Fb0 is calculated in step S328 or S330. Thus, time-consuming calculations such as multiplication and division are eliminated from the processing in steps S321 and S322. Consequently, the processing time taken from the detection of the zoom position in step S302 to the output of the focus drive signal in step S310 can be made small reliably, unless the zoom table number N changes by two or more exceptionally. Moreover, the determination as to whether or not calculation of Fa1 or Fb1 in step S328 or S330 is to be performed is made based on the zoom position and the zoom speed, and the calculation is performed only when necessary. Therefore, an increase in the processing load can be prevented.

While two values Fa1 and Fb1 are used in the processing in this embodiment, the values used in the processing are not limited to these two values. Further values Fa2 and Fb2 associated with zoom positions for which the zoom table numbers N are next to the zoom table numbers of the zoom positions associated with Fa1 and Fb1 may be calculated so that the process can be applied to cases where the zoom table number N changes by two or more.

Third Embodiment

The construction of a lens apparatus 1 according to the third embodiment to which the present invention can be applied is the same as that of the lens apparatus 1 according to the first embodiment and will not be described further.

Software processing executed by the CPU 20 in the third embodiment will be described.

The flow chart of the main process of the software processing executed by the CPU 20 in this embodiment is the same as that in the first embodiment. The initializing process and the normal process, which are different from those in the first embodiment, will be described in the following.

Figure 11:
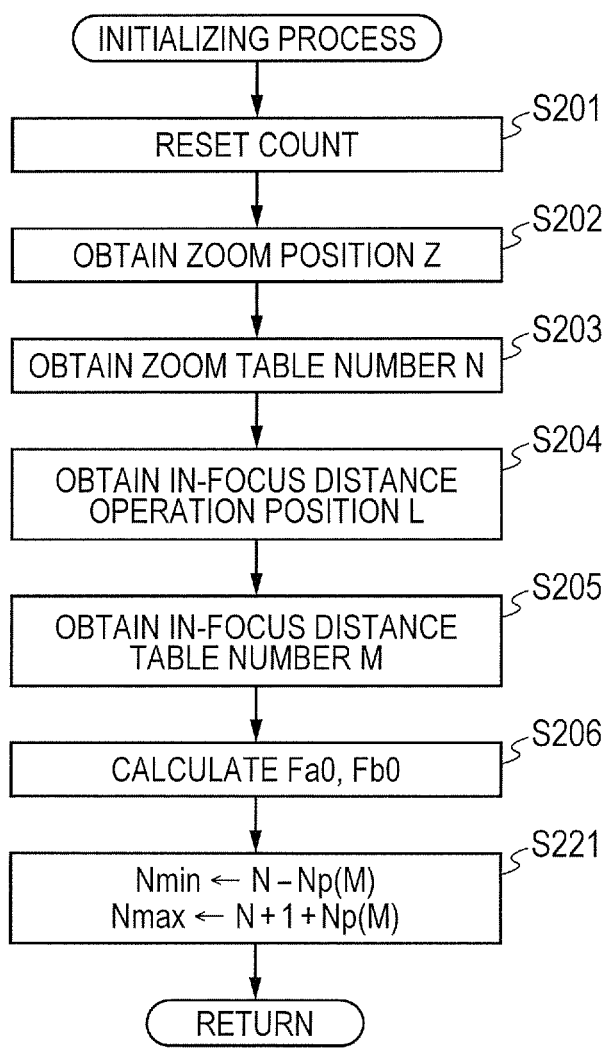
FIG. 11 is a flow chart of an initializing process in a third embodiment.

FIG. 11 is a flow chart of the initializing process (step S101 in FIG. 2) in the third embodiment. The processing in steps S201 to S206 is the same as that in the first embodiment. In step S221, an allowable range Nmin, Nmax for the zoom table number is calculated according to the following equations:

$$N\text{min}=N-Np(M) \quad \text{(Equation 6), and}$$

$$N\text{max}=N+1+Np(M) \quad \text{(Equation 7).}$$

Figure 12:
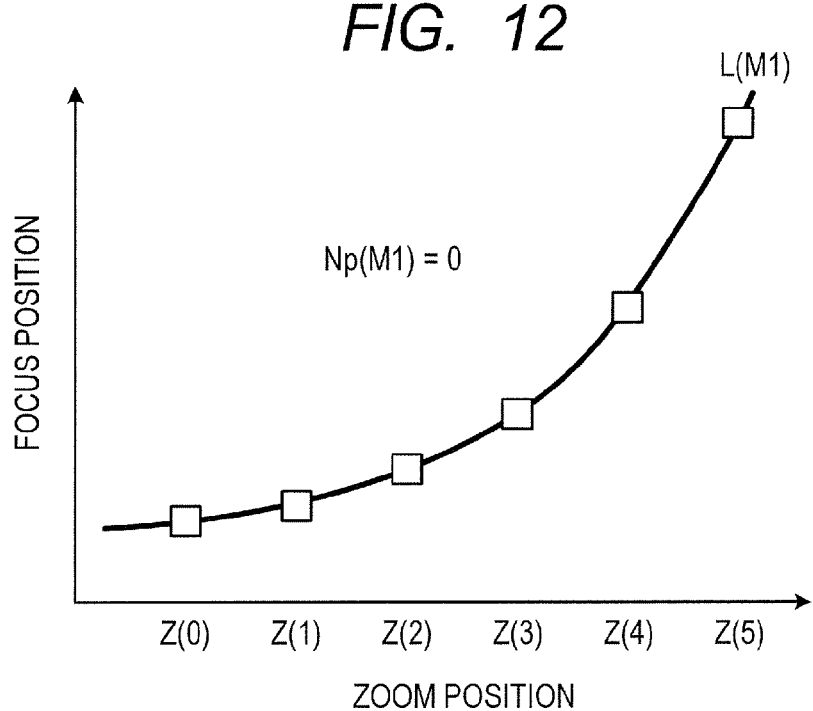
FIG. 12 is a first graph illustrating Np(M).
Figure 13:
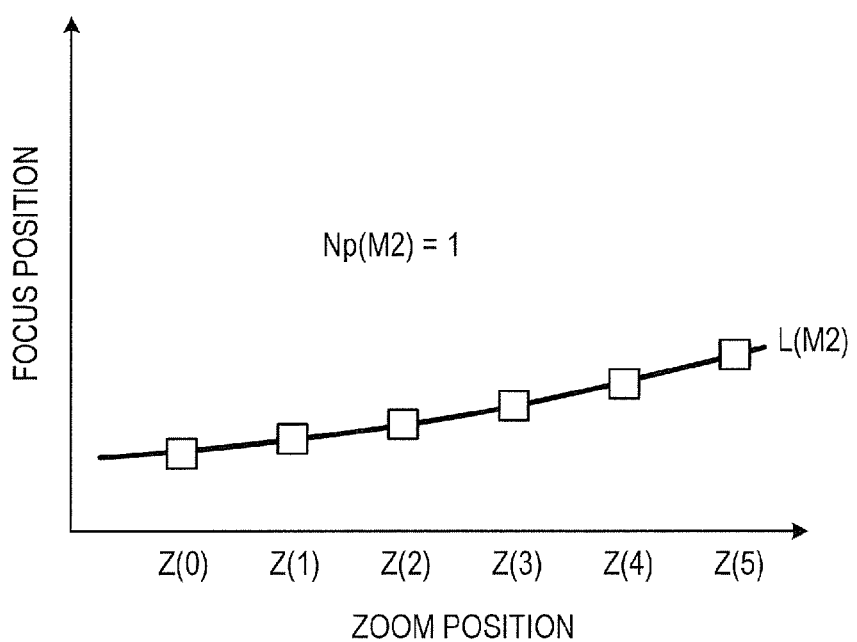
FIG. 13 is a second graph illustrating Np(M).

In the above equations, Np(M) is a natural number larger than 0, which represents the linearity of changes in the focus target position with changes in the zoom position Z. The value of Np(M) is obtained with reference to the in-focus distance table number M. Specifically, as shown in FIGS. 12 and 13, the value of Np(M) is set to 0 for in-focus distance operation positions at which the linearity of the relationship between the zoom position and the focus position is low and to 1 for in-focus distance operation positions at which the linearity of the relationship between the zoom position, and the focus position is high. In this embodiment, the value of Np(M) is obtained using a table stored in advance.

FIG. 14 is a flow chart of the normal process (step S102 in FIG. 2). In the third embodiment. After the zoom table number N is obtained in step S303, it is determined whether or not the zoom table number N falls in the range from Nmin (inclusive) to Nmax (exclusive). If the zoom table number N falls in the range, the process proceeds to step S308 without making the determination in step S304. If the zoom table number N falls out of the range from Nmin (inclusive) to Nmax (exclusive), the process proceeds to step S304, where the processing same as that in the first embodiment is executed.

The processing in steps S308 to S316 are the same as the corresponding processing in the first embodiment. After the values of Fa0 and Fb0 are newly calculated in step S316, the process proceeds to step S332, where the allowable range Nmin, Nmax for the zoom table number is calculated in the same manner as in step S221.

Advantageous effects of this embodiment are as follows. In the case of in-focus distance table numbers M for which the value of Np(M) is 0, in other words, at in-focus distance operation positions at which the linearity of changes in the focus target position in relation to changes in the zoom position is low, Nmin=N and Nmax=N+1 according to equations 6 and 7. In such cases, the overall process is the same as that in the first embodiment, and the advantageous effects same as the first embodiment can be achieved.

On the other hand, in the case of in-focus distance table numbers M for which the value of Np(M) is 1, in other words, at in-focus distance operation positions at which the linearity of changes in the focus target position in relation to changes in the zoom position is high, Nmin=N−1 and Nmax=N+2 according to equations 6 and 7. In such cases, if the zoom table number N is in the range from Nmin (inclusive) to Nmax (exclusive), the process will not proceeds to step S304, and a change in the zoom table number N from that at the time of previous calculation of Fa0 or Fb0 by only 1 does not necessitate calculation of Fa0 or Fb0 for update in step S305 or S306. Therefore, at in-focus distance operation positions at which the linearity of changes in the focus target position in relation to changes in the zoom position is high, calculation of Fa0 or Fb0 is not performed. Consequently, the processing time taken from the detection of the zoom position in step S302 to the output of the focus drive signal in step S310 can be made small reliably. As will be seen from the above, Np(K) represents a zoom table number difference (allowable zoom reference number difference) that, serves as a criterion for a determination, made upon a change in the zoom position, as to whether or not the linearity is so high that the last interpolation calculation can also foe applied to the next interpolation calculation. If the difference between the zoom table numbers N obtained this time and last time is equal to or smaller than the allowable zoom reference number difference, it is determined that the linearity is so high that, the last, interpolation calculation can also be applied to the interpolation calculation of this time, and calculation of the provisional focus target, position Fa0, Fb0 is not performed in this execution of the routine. If the zoom table number N has changed by 1 after the calculation of Fa0 or Fb0, the present zoom position Z is out of the range between the zoom position associated with Fa0 and the zoom position associated with Fb0. However, it is ensured that, the linearity of changes in the focus target position relative to changes in the zoom position is high, an error will be in an allowable range.

While in this embodiment an illustrative case in which the value of Np(M) is set to 0 or 1 has been described, the value of Np(M) may be set to 2 or more on condition that, the linearity is high. While in this embodiment, the value of Np(M) is determined with reference the in-focus distance table number M, Np(M) may foe replaced with Np(N) whose value is determined with reference to the zoom table number N, or Np(M) may be replaced with Np(N,M) whose value is determined with reference to both the in-focus distance table number K and the zoom table number N.

In the above embodiments, illustrative cases in which interpolation calculation based data of two points have been described. However, the present invention is not limited to this. The advantages of the present invention can also be enjoyed also in cases where interpolation calculation based on data of a plurality of points is employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-003180, filed Jan. 11, 2013, which is hereby incorporated by reference herein in its entirety.

What is claimed is:

1. A lens apparatus comprising:
a zoom unit that changes a focal length;
a zoom position detector that detects a zoom position, the zoom position being the position of the zoom unit;
a focus unit that changes an in-focus distance;
a focus position detector that detects a focus position, the focus position being the position of the focus unit;
a focus driver that drives the focus unit;

a focus operation unit configured to direct an in-focus distance;

a memory unit in which a relationship between the zoom position and a position of the focus unit associated with the in-focus distance is stored;

a focus controller that controls the focus driver, wherein the focus controller performs the following operations respectively:

a first operation of deriving a plurality of provisional focus target positions based on a zoom position detected by the zoom position detector, an in-focus distance directed by the focus operation unit and the relationship stored in the memory unit; and a second operation of deriving a focus target position by interpolation calculation based on the plurality of provisional focus target positions that are derived, wherein a frequency of the first operation is less than a frequency of the second operation.

2. A lens apparatus according to claim 1, wherein the focus controller performs the first operation and the second operation respectively periodically, and an operation cycle of the first operation is longer than an operation cycle of the second operation.

3. A lens apparatus according to claim 2, wherein the focus controller determines as to whether to perform or not a third operation which derives at least any one of the plurality of provisional focus target positions based on a zoom position difference which is a difference between two of the detected zoom positions at cycles adjacent to each other.

4. A lens apparatus according to claim 3, wherein the focus controller performs a fourth operation of deriving a preliminary provisional focus target position based on the detected zoom position, the directed in-focus distance, the detected focus position, and the relationship, and in performing the third operation, the focus controller derives the provisional focus target positions on the basis of the derived preliminary provisional focus target positions.

5. A lens apparatus according to claim 4, wherein the focus controller derives a zoom speed on the basis of the detected zoom position and determines whether or not to perform the fourth operation on the basis of the detected zoom position and the detected zoom speed.

6. A lens apparatus according to claim 3, wherein the focus controller sets an allowable zoom position difference on the basis of at least one of the detected zoom position and the directed in-focus distance, and when the zoom position difference is equal to or smaller than the allowable zoom position difference, the focus controller does not perform the third operation.

7. A lens apparatus according to claim 1, wherein the focus unit is arranged closer to the image than the zoom unit.

8. An image pickup apparatus comprising:
a lens apparatus comprising:
a zoom unit that changes a focal length;
a zoom position detector that detects a zoom position, the zoom position being the position of the zoom unit;
a focus unit that changes an in-focus distance;
a focus position detector that detects a focus position, the focus position being the position of the focus unit;
a focus driver that drives the focus unit;
a focus operation unit configured to direct an in-focus distance;
a memory unit in which a relationship between the zoom position and a position of the focus unit associated with the in-focus distance is stored;
a focus controller that controls the focus driver, wherein the focus controller performs the following operations respectively:

a first operation of deriving a plurality of provisional focus target positions based on a zoom position detected by the zoom position detector, an in-focus distance directed by the focus operation unit and the relationship stored in the memory unit; and a second operation of deriving a focus target position by interpolation calculation based on the plurality of provisional focus target positions that are derived;

wherein a frequency of the first operation is less than a frequency of the second operation, and an image pickup element, which receive light from the lens apparatus.

9. A lens apparatus comprising:
a zoom unit;
a zoom position detector that detects a position of the zoom unit;
a focus unit that corrects a displacement of an imaging position due to a driving of the zoom unit;
a focus position detector that detects a position of the focus unit;
a focus driver that drives the focus unit;
a memory unit that stores a target position data of the focus unit to obtain an in-focus state at a position of the zoom unit; and
an operating unit that performs: a first operation that reads from the memory unit a plurality of target position data that are specified based on a position of the zoom unit detected by the zoom position detector and on a position of the focus unit detected by the focus position detector; and a second operation that performs an interpolation calculation to obtain a target position of the focus unit between two of the plurality of target position data that is read in the first operation wherein a cycle of the second operation is shorter than a cycle of the first operation.

10. A lens apparatus comprising:
a zoom unit;
a zoom position detector that detects a position of the zoom unit;
a focus unit that corrects a displacement of an imaging position due to a driving of the zoom unit;
a focus position detector that detects a position of the focus unit;
a focus operation unit that operates a position of the focus unit;
a memory unit that stores a target position data of the focus unit to obtain an in-focus state at a position of the zoom unit; and
an operating unit that performs: a first operation that reads from the memory unit a plurality of target position data that are specified based on a position of the zoom unit detected by the zoom position detector, on a position of the focus unit detected by the focus position detector, and on an operating position of the focus operation unit; and a second operation that performs an interpolation calculation to obtain a target position of the focus unit between two of the plurality of target position data that is read in the first operation wherein a cycle of the second operation is shorter than a cycle of the first operation.

* * * * *